Sept. 2, 1941.  M. F. MILLER  2,254,488

SOUND PRODUCING APPARATUS

Filed Sept. 26, 1940   2 Sheets-Sheet 1

INVENTOR.
Milo F. Miller
BY
ATTORNEY.

Sept. 2, 1941. M. F. MILLER 2,254,488
SOUND PRODUCING APPARATUS
Filed Sept. 26, 1940 2 Sheets-Sheet 2

INVENTOR.
Milo F. Miller
BY
ATTORNEY.

Patented Sept. 2, 1941

2,254,488

UNITED STATES PATENT OFFICE 2,254,488

SOUND PRODUCING APPARATUS

Milo F. Miller, Kansas City, Mo.

Application September 26, 1940, Serial No. 358,454

10 Claims. (Cl. 84—404)

This invention relates to sound producing apparatus in the nature of an amusement device or one designed for use as a part of an electric signal, and the primary object is the provision of simple, unique and inexpensive equipment having as a part thereof a gravity actuated element movable through a path of travel along which is disposed a series of vibratory members tuned to suit conditions and to emit an agreeable series of tones.

This invention has for one of its important aims the provision of apparatus of the aforementioned character wherein is provided a specially formed passage having parts associated therewith and operable by a gravity actuated ball, for producing a series of different tones as the ball moves from one end of said passage to the other.

Another object of this invention is to provide sound producing apparatus with a unique combination of parts, one of which is adapted to return a freely movable ball to one end of a definite path of travel, which last mentioned path of travel has a plurality of sections therein disposed to impart additional speed and force to the said ball as it moves from one end of said passage to the other.

Specific objects of the invention and the manner of incorporating the concepts thereof in at least two types of sound producing devices, will appear during the course of the following specification referring to the accompanying drawings wherein.

Figure 1:
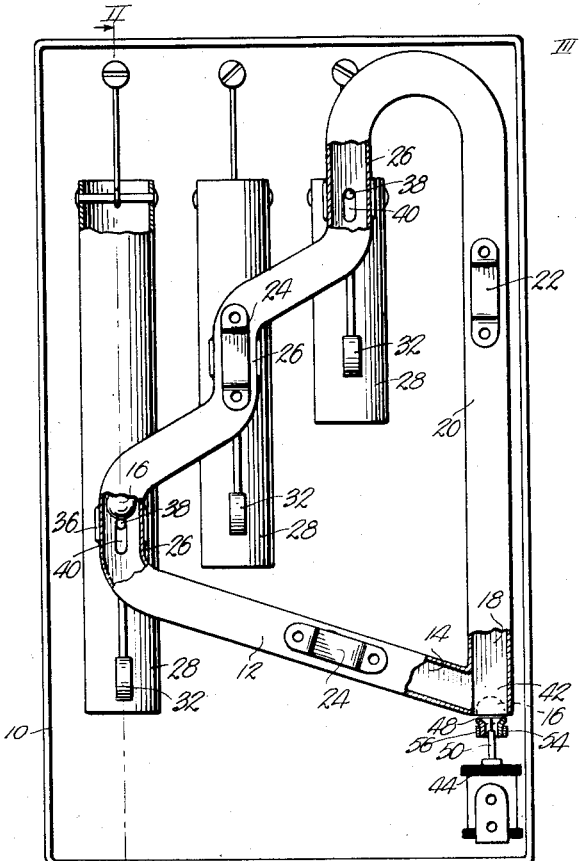
Figure 1 is a side elevational view of an electrically operated sound producing apparatus made to embody the present invention.
Figure 2:
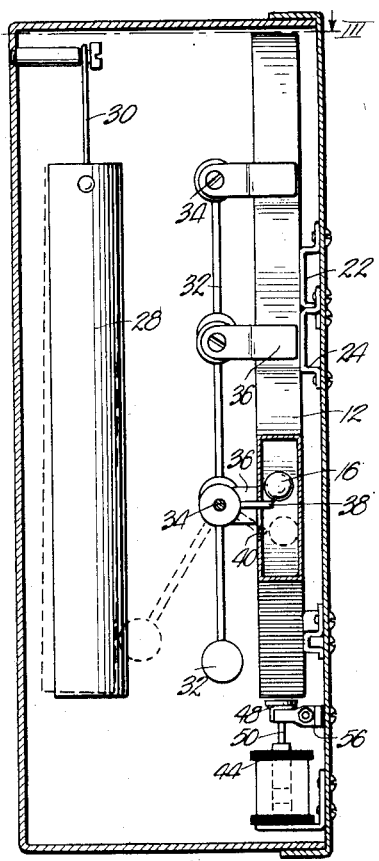
Fig. 2 is a vertical sectional view through the device, taken on line II—II of Fig. 1.
Figure 3:
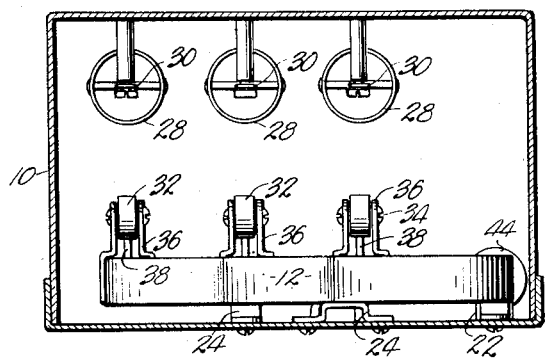
Fig. 3 is a cross sectional view taken on line III—III of Fig. 2.

Referring to the form of the invention shown in Figs. 1 to 4 inclusive, case 10 is of conventional type and employed merely to house the hereinafter described parts of the apparatus.

Within case 10 is suspended a serpentine conduit 12 within which is formed passage 14 for the movement of ball 16. Passage 14 is in communication with a return chamber 18 created within tubular element 20 supported by case 10 through the medium of brackets 22. Similar supporting brackets 24 are provided for conduit 12.

As will be appreciated from an observance of Fig. 1, conduit 12 has a series of vertical sections 26 formed therein adjacent a number of sound producing members 28. Sound producing members 28 are suspended by hangers 30 within case 10 for free vibration, and if necessary, for swinging movement.

Each of members 28 has a hammer 32 associated therewith that is operable by the passage of ball 16 along the vertical sections 26. These hammers are identical in nature and each is pivotally mounted as at 34 on bearings 36.

A finger 38 projects into passage 14 through an opening 40 formed in conduit 12 and therefore, into the path of travel of ball 16. When said ball strikes finger 38 of any of hammers 32, the latter is lifted to the position shown in dotted lines of Fig. 2, to strike the associated sound producing member. As ball 16 moves by gravity through passage 14 all of the hammers are actuated, and therefore, a proper sequence of sound produced.

Figure 4:
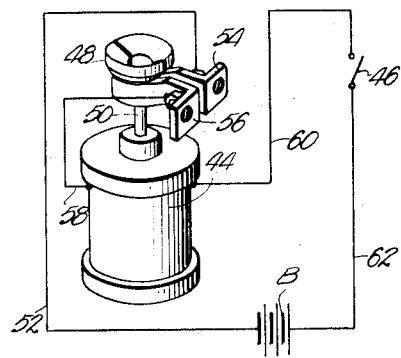
Fig. 4 is a wiring diagram illustrating the manner in which the solenoid may be joined to a source of electrical energy.

When ball 16 reaches cavity 42 provided at the zone of juncture between passage 14 and return chamber 18, it dwells until the electrically operated mechanism, shown in Fig. 4, forces it back to the upper end of passage 14 or the point of beginning.

Solenoid 44 is energized by closing switch 46, providing ball 16 which is conducting material, is disposed in cup 48 secured to one end of reciprocating core 50. From battery B the current passes through wire 52 to one side of bracket 54 and thence to a section of cup 48. If the ball 16 is in place, the circuit will be closed through said ball 16, the other side of cup 48, member 56, wire 58, solenoid 44, wire 60, closed switch 46 and wire 62. The automatic operation of this electrical embodiment of the sound producing apparatus will continue so long as switch 46 is closed. The force of solenoid 44 must be sufficient to direct ball 16 vertically through return chamber 18 to the upper end of passage 14.

Figure 5:
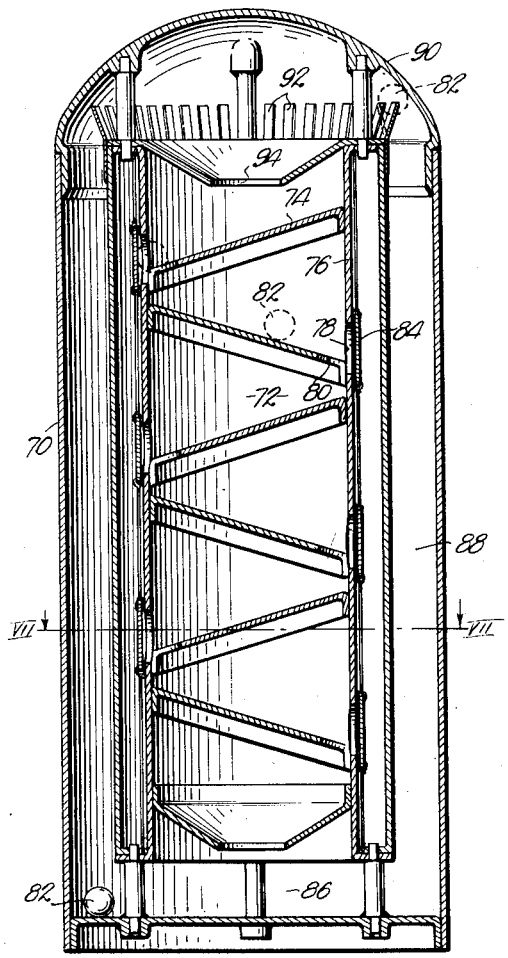
Fig. 5 is a vertical central sectional view through a manually operable device made in accordance with a modified form of the invention.
Figure 6:
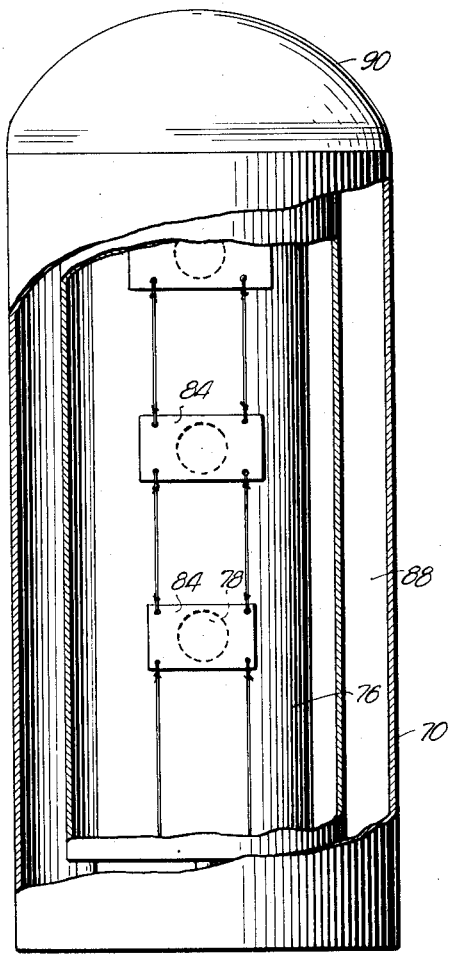
Fig. 6 is a side elevational view of the embodiment shown in Fig. 5, parts being broken away for clearness.
Figure 7:
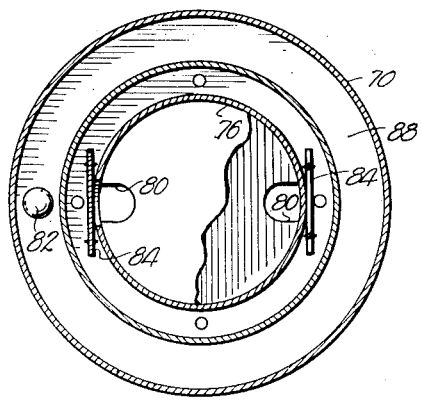
Fig. 7 is a cross sectional view through the apparatus shown in Fig. 5, taken on line VII—VII thereof.

In the embodiment of the invention illustrated in Figs. 5, 6 and 7, the device presented is manually operable by reversing the case 70. Case 70 has a passage 72 created therein through the medium of several inclined partitions 74 disposed within an inner tubular wall 76. This wall 76 is provided with a series of openings 78 at the point of juncture with the lowermost parts of partitions 74, and each partition has a hole 80 at its lowermost part for the passage of ball 82. Each opening 78 has a sound producing member 84 suspended thereover that is struck by ball 82 as it travels through the circuitous path along partitions 74.

Ball 82 moves as just described through the action of gravity and drops into cavity 86 formed at the juncture between return chamber 88 and passage 72.

When case 70 is reversed from the position shown in Figs. 5 and 6, ball 82 will move toward the dome-shaped end wall 90 of case 70 and be directed toward the longitudinal axis of said case past resilient fingers 92. These fingers flex to permit ball 82 to again enter passage 72 through inlet port 94, but in the event case 70 is tilted to the horizontal position after ball 82 has passed fingers 92, it cannot accidentally return to cavity 86.

Sound producing members 82 are constructed to suit conditions and preferably to play a bar of a well-known tune which is repeated merely by reversing end-for-end case 70.

Manifestly, the broad concepts of this invention are embodied in both designs of the sound producing apparatus illustrated herewith, and it is obvious to one skilled in the art that apparatus having physical characteristics different from those shown, might be made without departing from the spirit of the invention or scope of the appended claims.

Having thus described the invention, what is claimed as new and desired to be secured by Letters Patent is:

1. Sound producing apparatus comprising a case provided with a passage and a return chamber therein; a ball freely movable along the passage and the return chamber; and a plurality of sound-producing members disposed at spaced apart points along the passage and adapted to be vibrated by movement of the ball past the said points.

2. Sound producing apparatus comprising a case provided with a passage and a return chamber therein; a ball freely movable along the passage and the return chamber; and a plurality of sound-producing members disposed at spaced apart points along the passage and adapted to be vibrated by movement of the ball past the said points, said ball being movable along the passage by action of gravity.

3. Sound producing apparatus comprising a case provided with a passage and a return chamber therein; a ball freely movable along the passage and the return chamber; and a plurality of sound-producing members disposed at spaced apart points along the passage to be vibrated by movement of the ball past the said points, said passage and return chamber being interconnected to form a continuous path of travel for the ball and provided with a cavity at the juncture between one end of the passage and the chamber for holding the ball against movement.

4. Sound producing apparatus comprising a case provided with a passage and a return chamber therein; a ball freely movable along the passage and the return chamber; a plurality of sound producing members disposed at spaced apart points adjacent the passage and adapted to be vibrated by movement of the ball past the said points, said passage and chamber being in communication and provided with a cavity at their zone of juncture for holding the ball in a set position.

5. Sound producing apparatus comprising a case provided with a passage therein; a ball freely movable by gravity along the passage from one end thereof to the other; a plurality of sound producing members disposed at spaced apart points adjacent to the passage; and a hammer for each member respectively extending into the passage, said hammers being operable by the ball as the same travels along the passage.

6. Sound producing apparatus comprising a case provided with a passage therein; a ball freely movable by gravity along the passage from one end thereof to the other; a plurality of sound producing members disposed at spaced apart points adjacent to the passage; and a hammer for each member respectively extending into the passage, said hammers being operable by the ball as the same travels along the passage, each of said hammers being hung to automatically return by gravity to a set position after being moved against the sound producing member by the ball.

7. Sound producing apparatus comprising a case provided with a passage therein; a ball freely movable by gravity along the passage from one end thereof to the other; a plurality of sound-producing members disposed at spaced apart points adjacent to the passage; and a hammer for each member respectively extending into the passage, said hammers being operable by the ball as the same travels along the passage, said apparatus having means for forcing the ball from the lowermost point in the passage to the said one end thereof.

8. Sound producing apparatus comprising a case provided with a passage therein; a ball freely movable by gravity along the passage from one end thereof to the other; a plurality of sound-producing members disposed at spaced apart points adjacent to the passage; and a hammer for each member respectively extending into the passage, said hammers being operable by the ball as the same travels along the passage, said passage having vertical sections therein adjacent to the sound-producing members, the hammers having portions thereof respectively extending into the vertical sections.

9. Sound producing apparatus comprising a case provided with a passage and a return chamber therein; a ball freely movable by gravity along the passage from one end thereof to the other; a plurality of sound-producing members disposed at spaced apart points adjacent to the passage; openings formed in the wall of the case creating the passage; and means for directing the force of the ball against the said members as it passes said openings, said passage and return chamber being interconnected to form a continuous path of travel for the ball.

10. Sound producing apparatus comprising a case provided with a passage therein; a ball freely movable by gravity along the passage from one end thereof to the other; a plurality of sound-producing members disposed at spaced apart points adjacent to the passage; openings formed in the wall of the case creating the passage; and means for directing the force of the ball against the said members as it passes said openings, said sound-producing members being plates suspended over the openings for direct engagement by the balls.

MILO F. MILLER.